United States Patent
Boss et al.

(10) Patent No.: US 8,136,090 B2
(45) Date of Patent: Mar. 13, 2012

(54) SYSTEM AND METHODS FOR APPLYING SOCIAL COMPUTING PARADIGM TO SOFTWARE INSTALLATION AND CONFIGURATION

(75) Inventors: Gregory J. Boss, American Fork, UT (US); Rick A. Hamilton, II, Charlottesville, VA (US); Brian M. O'Connell, Cary, NC (US); John R. Pavesi, Cedar Park, TX (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1482 days.

(21) Appl. No.: 11/614,291

(22) Filed: Dec. 21, 2006

(65) Prior Publication Data
US 2008/0155534 A1 Jun. 26, 2008

(51) Int. Cl.
*G06F 9/44* (2006.01)
*G06F 9/445* (2006.01)

(52) U.S. Cl. ......... 717/121; 717/120; 717/171; 717/176

(58) Field of Classification Search .................. None
See application file for complete search history.

(56) References Cited

U.S. PATENT DOCUMENTS

| | | | |
|---|---|---|---|
| 5,367,686 A | 11/1994 | Fisher et al. | |
| 6,237,092 B1 | 5/2001 | Hayes, Jr. | |
| 6,282,711 B1 | 8/2001 | Halpern et al. | |
| 6,606,744 B1 * | 8/2003 | Mikurak | 717/174 |
| 7,051,327 B1 * | 5/2006 | Milius et al. | 717/177 |
| 7,155,678 B2 * | 12/2006 | Cooper et al. | 715/744 |
| 7,367,014 B2 * | 4/2008 | Griffin | 717/107 |
| 7,458,073 B1 * | 11/2008 | Darling et al. | 717/168 |
| 7,904,511 B2 * | 3/2011 | Ryan et al. | 709/204 |
| 2002/0059201 A1 * | 5/2002 | Work | 707/3 |
| 2002/0087966 A1 | 7/2002 | Wiginton, III et al. | |
| 2003/0018964 A1 * | 1/2003 | Fox et al. | 717/177 |
| 2003/0037044 A1 * | 2/2003 | Boreham et al. | 707/3 |
| 2005/0044531 A1 * | 2/2005 | Chawla et al. | 717/122 |
| 2005/0125509 A1 | 6/2005 | Ramachandran | |
| 2005/0160420 A1 | 7/2005 | Kruta et al. | |
| 2005/0223374 A1 * | 10/2005 | Wishart et al. | 717/173 |
| 2005/0251786 A1 | 11/2005 | Citron et al. | |
| 2006/0218225 A1 | 9/2006 | Hee Voon et al. | |
| 2007/0294669 A1 * | 12/2007 | Robalewski et al. | 717/120 |
| 2011/0045806 A1 * | 2/2011 | Gupta et al. | 455/414.1 |

* cited by examiner

*Primary Examiner* — Jason Mitchell
(74) *Attorney, Agent, or Firm* — Cahn & Samuels, LLP

(57) ABSTRACT

A method for installation and configuration of a software product includes installing a software product and determining configuration settings of the software product based upon a social network of peers. A system for installation and configuration of at least one software product includes at least one client install package capable of utilizing a social network for at least one of installing software; transmitting configuration settings; transmitting post-installation configuration settings; or responding to post-installation configuration modifications; and a server that stores and aggregates the configuration settings of a plurality of users, forming at least one social network.

7 Claims, 5 Drawing Sheets

US 8,136,090 B2

SYSTEM AND METHODS FOR APPLYING SOCIAL COMPUTING PARADIGM TO SOFTWARE INSTALLATION AND CONFIGURATION

I. FIELD OF THE INVENTION

This invention relates to a system and methods for applying a social computing paradigm for installation and configuration of at least one software product.

II. BACKGROUND OF INVENTION

There are several inadequate approaches to software installation and configuration. One approach is to provide installation/configuration defaults. However, such defaults are not tailored to each user. Thus, each user has to spend significant time tailoring the software product to suit his or her specific needs. Another approach to software installation/configuration is to have a user select from a tier of user types, for example, expert, intermediate, or novice. Such tiers, however, are too broad. A programmer is by definition not a novice. Therefore, any tiers or settings developed by a programmer may be misaligned with the corresponding user's capabilities. Further, users may be unable to correctly categorize themselves into one of these preset tiers.

Still another approach is to provide custom automation, such as enterprise software distribution. Custom automation tailors software distribution packages to a group. Individuals are lumped into organization categories. In addition, tailoring software distribution to groups is expensive because many different packages must be created, tested, and managed. Another option is to have users install software via saved settings from other users or groups. However, such user or group settings must be manually created. In addition, such user or group settings must be known to the user prior to installing and configuring software. The user or group settings may also not be a good match for a particular user.

U.S. Patent Application Publication No. 2005/0251786 A1 discloses a system and method for dynamic software installation instructions. A customized instruction generator asks a user particular questions. In turn, the user provides answers, or system parameters. Based upon the user's response, the customized instruction generator asks system dependent questions to further collect more detailed system parameters. Once the customized instruction generator collects the system parameters it requires, the customized instruction generator retrieves an instruction template that includes parameter placeholders. The customized instruction generator replaces the parameter placeholders with corresponding system parameters, includes particular instruction subsections based upon the system parameters, and generates customized instructions for the user to follow in order to install software on a computer system.

U.S. Patent Application Publication No. 2002/0087966 A1 discloses a Wizard Building Application, Database, and Setup Wizard Application to solicit and apply user specific information to allow the installation of software packages by the end user without a software expert to guide the installation.

U.S. Patent Application Publication No. 2005/0125509 A1 discloses automated software provisioning based upon a set of role definitions for a user of a configurable device such as a computer or personal digital assistant. Role-based software provisioning automatically distributes the appropriate software programs and updates to computers that are owned by users based on the role of each user, thereby avoiding the need for intensive manual efforts to determine which computers need what software.

U.S. Pat. No. 6,282,711 B1 discloses a method for installing a subset of software components and data files contained in a component pool in a distributed processing network such as the Internet. An installation package delivered to a requesting end user is custom configured at a remote server location prior to delivery to a client system operated by the user, in response to the user's inputs. The delivered installation package contains only the programs, data, and local installation tools required for the user's unique installation requirements. The user initiates the installation process by connecting to the remote server system via a telecommunications link within a distributed processing network. Engaging in a dialog with the server which provides informational links to server-side databases, the user chooses all software components and options that he desires his software package to have. After selection of all options, a single package is manufactured on the server. A single download then occurs of a single file.

II. SUMMARY OF THE INVENTION

In an aspect of the invention, a method is provided for installation and configuration of a software product. A software product is installed and the configuration settings of the software product are determined based upon a social network of peers.

In another aspect of the invention, a method is provided in which a user is asked at least one question during installation of a software product. The user is micro-classified into at least one category by comparing the user's answer to the at least one question to the answers of other users. Configuration settings are downloaded that match the user's micro-classification.

In another aspect of the invention, a method is provided in which a user selects or subscribes to at least one profile of a user or a group of users. The configuration settings for a software product are downloaded based upon the at least one selected profile.

In another aspect of the invention, a user's configuration settings of an installed software product are analyzed. The configuration settings of the installed software product are compared with the configuration settings of a number of other users' installed software products. If the configuration settings are similar, the other users' configuration settings are downloaded for the user's installation and configuration of a new software product.

In another aspect of the invention, a user's selected installation options may be stored along with an appended directory.

In another aspect of the invention, a system is provided for installation and configuration of at least one software product. The system comprises at least one client install package capable of utilizing a social network for at least one of installing software; transmitting configuration settings; transmitting post-installation configuration settings; or responding to post-installation configuration modifications. The system also comprises a server that stores and aggregates the configuration settings of a plurality of users, forming at least one social network.

In another aspect of the invention, a computer program product is provided comprising a computer useable medium having a computer readable program. When executed on a computer, the computer readable program causes the computer to install a software product and to determine configuration settings of the software product based upon a social network of peers.

III. BRIEF DESCRIPTION OF THE DRAWINGS

IV. DETAILED DESCRIPTION OF THE DRAWINGS

FIGS. 1-5 show a system and methods according to the invention that enable software product configuration settings to be determined by a social computing paradigm, for example, a network of peers. The social network of peers may be defined not as "friends" or even people known to the user, but rather as individuals with similar skills, knowledge, or preferences. However, the present invention may be used with any definition of a peer.

According to the invention, a software product is installed and the configuration settings of the software product are determined based upon a social network of peers. The invention overcomes limitations of known approaches to software installation and configuration. Users are not required to self-categorize themselves into broad groups. Further, time is not spent by individuals or enterprises developing installation and post-installation automation. Instead, software installation and configuration is tailored to the individual, and ongoing configuration changes can easily be distributed to keep users up-to-date.

In this detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Figure 1:
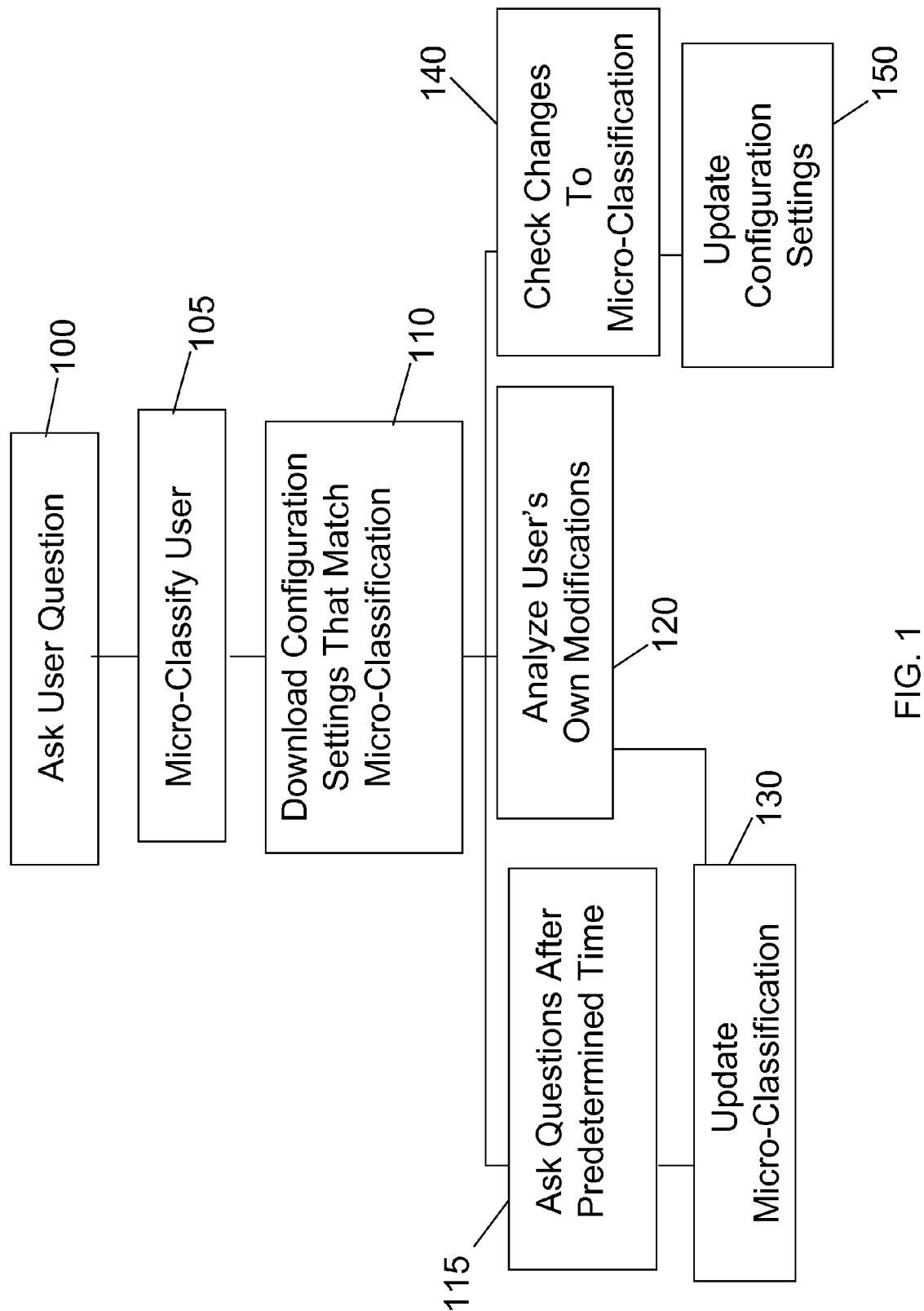
FIG. 1 is a flowchart of a method for configuring a software product according to a first embodiment of the invention.

FIG. 1 illustrates a method in which a user who is installing a software product is asked at least one question, 100. The at least one question may comprise yes or no questions, multiple choice questions, questions requiring a numerical response (e.g., manufacturer or product codes), questions requiring a narrative or text response, questions requiring selection from a predetermined list or menu, or any combination thereof. The at least one question may include, but is not limited to, questions about a user's computer usage, questions to gauge a user's computer experience and/or technological savvy (e.g., whether the user is a techie or novice), questions to gauge a user's personality (e.g., whether the user is an artist, intellectual, shy, outgoing), questions about a user's age, questions about a user's education, or any combination thereof. The at least one question may be modified based on the software application being installed.

The following are some example questions. This list is not intended to be exhaustive. Indented questions are only asked if the user chooses an answer for the question immediately above it.

1. On average how many hours a week do you use a computer?
2. How many years have you owned a computer?
3. Do you know the manufacturer of your computer?
   1. Do you know the manufacture of your network card?
      2. What duplex is your network card set to?
         3. What is your MTU Size?
4. What is the most common task you use your computer for?
5. What is your age?

Once the user has answered the at least one question, the answer is analyzed and compared to the answer of other users. Based upon that comparison, the user is classified into at least one type or category of user (micro-classification), 105. The appropriate configuration settings are downloaded that match the user's micro-classification, 110. The answers to the at least one question may be stored and accessed for subsequent software installations, so that the at least one question need not be asked before every installation.

In an embodiment, the at least one question may be asked after a predetermined time has elapsed after installation and configuration of a software product to assess changes in the user's knowledge and capability, 115. Similarly, a user's own modifications to configuration settings after installation and configuration of a software product may determine if the user has become aligned to a different type of micro-classification, 120. In either case, the user's micro-classification is updated accordingly, 130. In an embodiment, changes to the micro-classification may be checked, 140. The user may opt to periodically check changes to the micro-classification. Alternatively, changes to the micro-classification may be automatically checked. The user's configuration settings may be updated based upon any changes to the micro-classification, 150.

In an embodiment, at least one user may initially have to define generic configuration information for the software installation. For example, a user may choose among several coarse tiers of application users and their associated default configuration data. However, as more users configure the software application, the data will begin to accurately reflect good default configurations for different micro-classifications.

Figure 2:
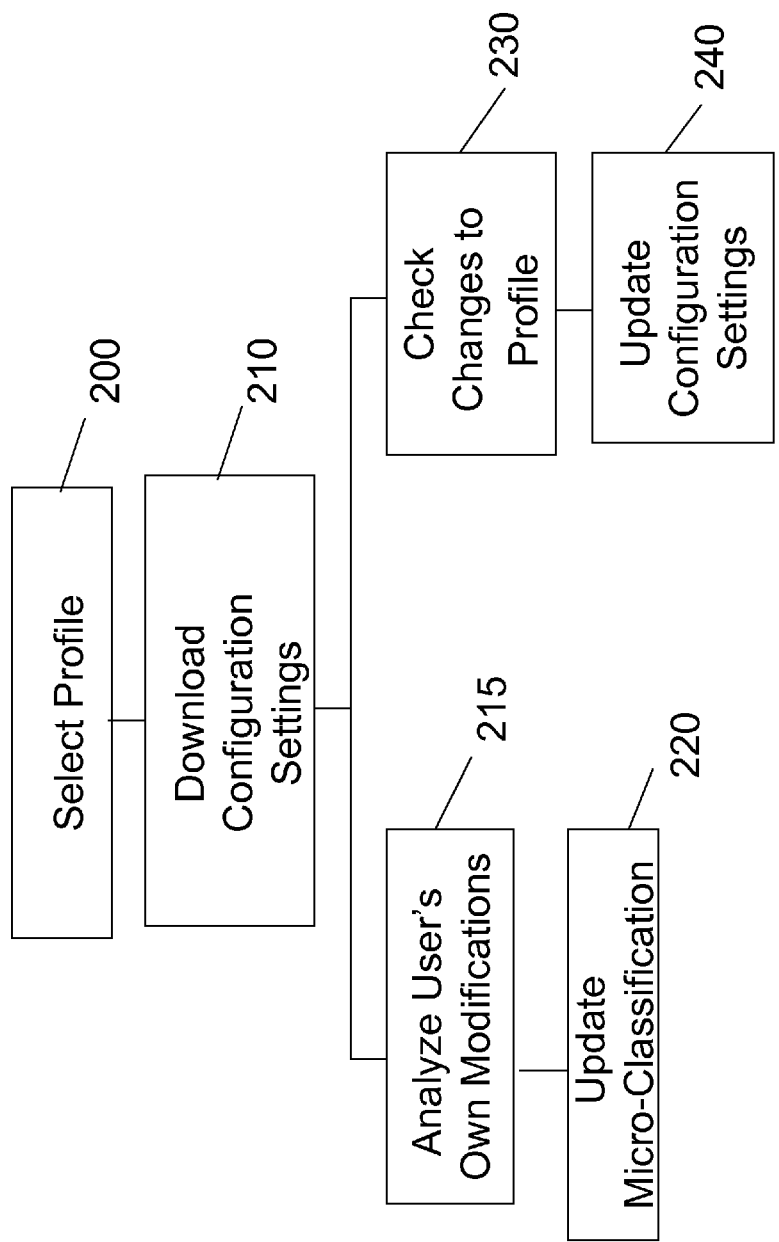
FIG. 2 is a flowchart of a method for configuring a software product according to a second embodiment of the invention.

FIG. 2 illustrates a method in which a user may select or subscribe to at least one published profile of a user or group of users that may best represent his or her interests. In an embodiment, the profile of a user or a group of users may be set-up based upon at least one question from a previous software installation and configuration. For example, during installation, a user may be asked to classify himself or herself by one of more categories including, but not limited to, age, educational level, educational institution, class or field of study, degree, geographic location, organization, club, hobbies, interests, company or employer name, job title, security level, administrator, family name, or technological level (e.g., techie, novice). In embodiments, this method may be used in conjunction with, or separately from, the method shown in FIG. 1.

A user may request software installation and configuration by selecting or subscribing to at least one of such profiles, 200. For example, a user may select the most popular configuration settings of a group of college students. In embodiments, a searchable list of automatically generated profiles may be available to the user. The user may choose configuration settings based upon more than one profile, i.e., from different users or groups. For example, a user may want the performance or privacy settings of a technically savvy user, but may want the interface settings of a novice user (e.g., a technically savvy person may be inclined to have a slimmed down interface, preferring to interact via key commands, which may be undesirable to a novice user).

The software is installed and the configuration settings are downloaded based upon the at least one selected profile, 210. Subsequent changes to the configuration settings made by the user may be analyzed, 215. The at least one profile may be updated accordingly, 220. In an embodiment, changes to the at least one profile may be checked, 230. The user may opt to periodically check for changes to the configured settings for the at least one selected profile. Alternatively, changes to the user's at least one selected profile may be automatically checked. The user's configuration settings may be updated based upon any changes to the at least one selected profile, 240.

Figure 3:
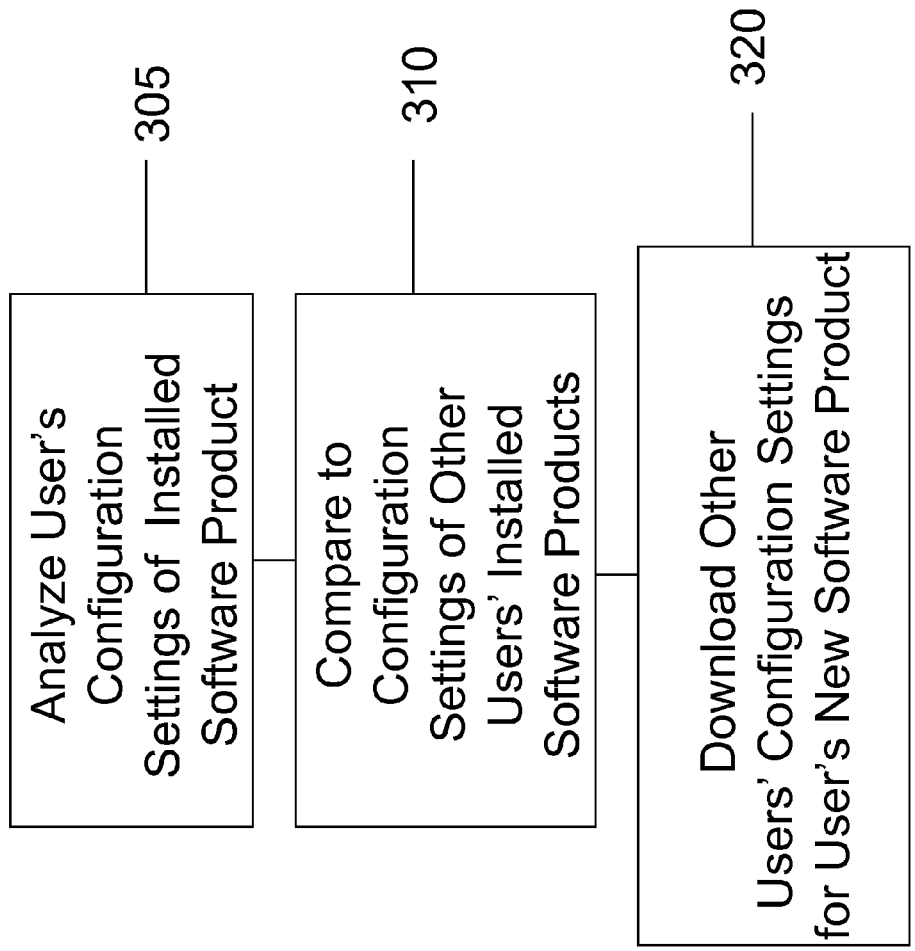
FIG. 3 is a flowchart of a method for configuring a software product according to a third embodiment of the invention.

FIG. 3 illustrates a method in which software installation and configuration is based upon transitive comparison within a network of peers. A user's configuration settings of an installed software product are analyzed, 305. The user's configuration settings are compared to the configuration settings of a number of other users' installed software products, 310 (e.g., 100-5,000 users). If the configured settings are similar, then the other users' configuration settings are downloaded for the user's installation and configuration of a new software product, 320. In embodiments, the comparing of the configuration settings may be based upon at least one of a predetermined degree of similarity, for example, 75% or 85% similarity, of configuration settings or upon a predetermined number of users, for example, the 200 most similar users.

When there are multiple programs for transitive comparison, the configured settings of the software product with the most users may be applied to the user's installation and configuration of a new software product. Alternatively, the configured settings of an intersection of users having the same multiple programs may be applied to the user's installation and configuration of a new software product.

In an embodiment, the comparing of configuration settings may be based upon the type of software product. For example, for a word processing or text program, the transitive comparison may look at the configuration settings of users of similar text applications (e.g., a large number of users). However, for games, the transitive comparison may look at the configuration settings of other gamers (e.g., a small number of users).

In an embodiment, at least one user may initially have to define generic configuration information for the software installation. For example, a user may choose among several coarse tiers of application users and their associated default configuration data. However, as more users configure the software application, the data will begin to accurately reflect good default configurations for transitive comparison.

Figure 4:
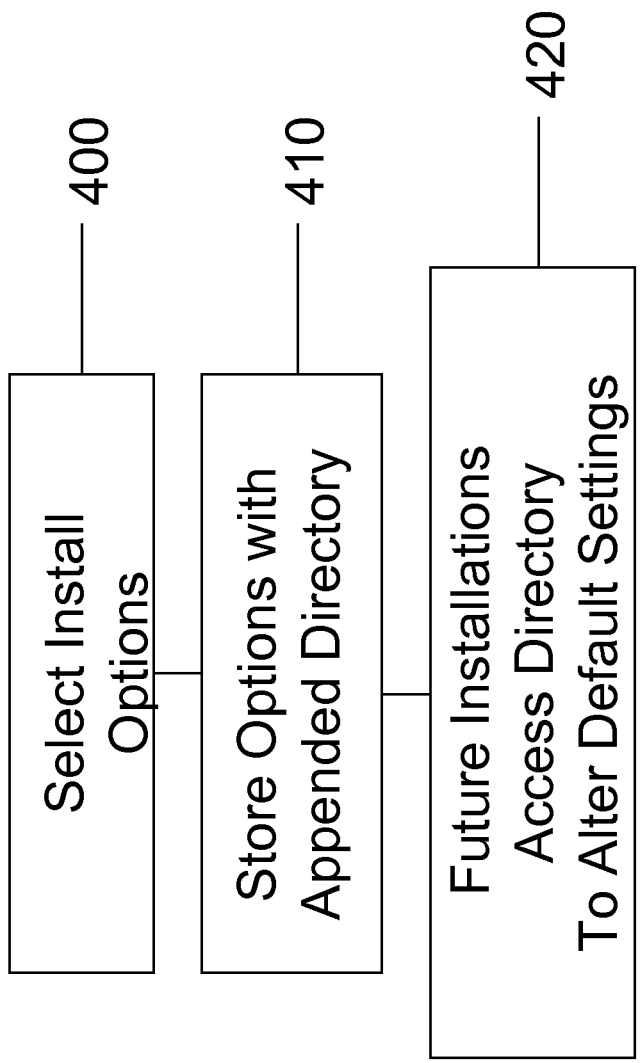
FIG. 4 is a flowchart of a method for configuring a software product according to a fourth embodiment of the invention.

FIG. 4 illustrates a method in which a user selects installation options, 400. The selected installation options are stored along with an appended directory, 410. Future installations are able to access the information contained in the appended directory to alter default settings, 420. For example, if a user changes the install options or defaults for a game, an appended directory (e.g., C:\ProgramFiles\Games\) is created. Future installation of games may access the default location "Games".

In embodiments, an appended directory may occur for at least one of help documentation, document translators, or language preferences based upon a user's install selections. For example, a multilingual person may always have to go into a sub-option during a software installation to select features for English, Spanish, or German. By accessing an appended directory, a software product installation and configuration will automatically select those languages in the future, thus saving time and the potential for missing such features (especially for installations that contain many layers of sub-options such as Microsoft Office®).

In embodiments, the method of FIG. 4 may be associated with the micro-classification method of FIG. 1 and/or the profile method of FIG. 2. Thus, if most software engineers typically install help documentation, then a directory may be added to the appropriate micro-classification or to a particular profile, such as a Software Engineer profile. If most technical writers install document translators, then a directory may be added to the corresponding micro-classification or to a related profile.

In at least one embodiment for any method of FIGS. 1-4, users may be given choices of privacy settings and/or preferences settings. For example, users may be given the choice of at least one of (1) what settings they insist may not be changed; (2) whether or not they want to receive notification before accepting or rejecting configuration settings; (3) how often they want to receive any micro-classification questions or profile questions; (4) whether they want to establish a profile to allow other users to subscribe to their settings (convenient for administrators or a family's self-proclaimed computer expert); (5) whether or not they want to receive any updated changes to configuration settings; (6) whether they want to participate in adding their configuration settings to aggregate stored data; (7) whether they want to set a minimum percentage of similarity before considering other users part of their peer network, or (8) whether they want to set a minimum number of users in a peer network before applying any of the methods of FIGS. 1-4. In an embodiment, a user may be able to opt out of any of the methods of FIGS. 1-4.

In enterprise software distribution solutions, the distribution packaging may disregard a user's preferences. The user's configuration settings may be determined after the software product is installed according to at least one of the methods of FIGS. 1-4.

The methods of this invention can be used with any type of software product, including applications, operating systems, hardware drivers, and the like. Specific applications include, but are not limited to, word processing or text applications, spreadsheet applications, instant messaging or text messaging applications, internet or web applications, utilities, integrated development environments, multimedia applications, or games.

Figure 5:
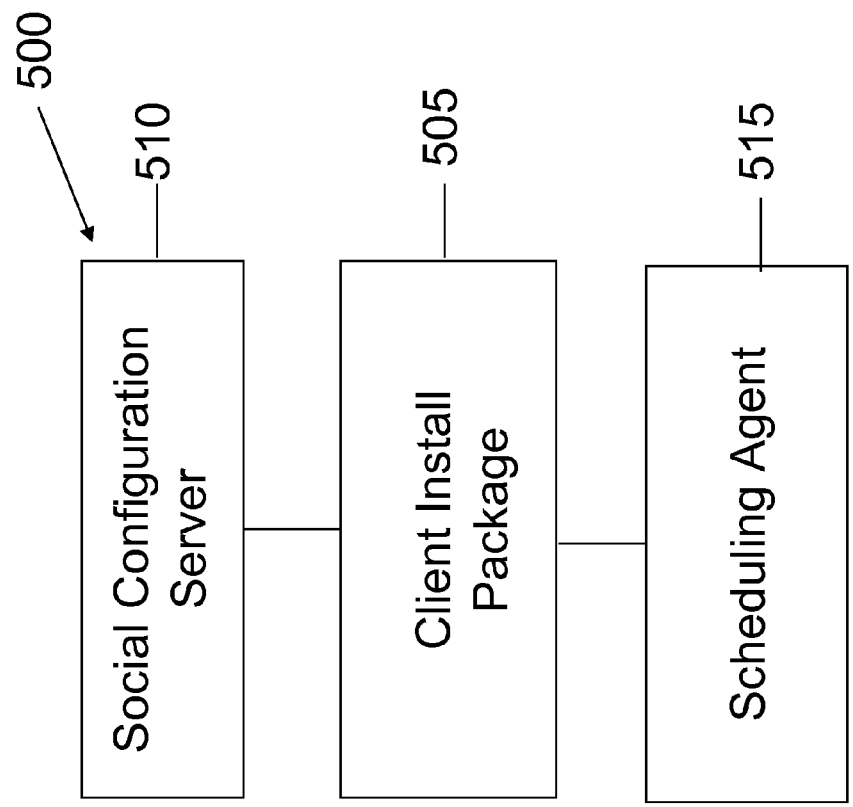
FIG. 5 is a block diagram of a system according to an embodiment of the invention.

FIG. 5 illustrates a system of the invention. System 500 may comprise a client-server architecture including at least one client installation package 505 and at least one social configuration server 510. In embodiments, the system may also include a scheduling agent 515.

In an embodiment, the at least one client install package may be an extension to a product installation engine, for example, Macromedia's InstallShield® or Microsoft's Windows® Installer. This extension setup works for setup executable technologies, online installation technologies, and enterprise software distribution systems (e.g., Tivoli Orchestrator® and other Tivoli products). In other embodiments, the at least one client install package may be on a separate server or may be a third party application service that installs and configures other companies' software products. The at least one client install package is capable of utilizing a social network for at least one of installing software; transmitting configuration settings; transmitting post-installation configuration settings; or responding to post-installation configuration modifications.

The at least one social configuration server may comprise a server application (e.g., IBM's WebSphere®) or a custom socket listener that is capable of processing multiple simultaneous inbound requests from the at least one client installation package. The server stores and aggregates the configuration settings of a plurality of users, forming at least one social network via the methods of FIGS. 1-3. The server retrieves stored configuration settings or defaults on demand.

The system may also comprise a scheduling agent 515 for prompting the at least one client installation package 505 to contact a user, a social configuration server 510, or a combination thereof.

As illustrated in FIG. 1, the client install package may ask a user at least one question. The client installation package relays the answers to the social configuration server. The server compares the answers to other users' answers and classifies the user into at least one category (micro-classification). The server downloads and the client installation package installs configuration settings that match the user's micro-classification. In an embodiment, the server may store the answers to the at least one question, so the same questions do not need to be asked by a client installation package before every software product installation. The server processes incoming configuration modifications that are mapped to specific micro-classifications. Over time, these mapped configuration modifications help define the micro-classification default configuration settings.

The client installation package may relay a user's own modifications to configuration settings to the server after software installation to determine if the user has become aligned to a different type of user. If so, the server updates the user's micro-classification accordingly. In an embodiment, a scheduling agent may prompt the client installation package to ask at least one question after a predetermined time has elapsed to allow for changes in user knowledge and capability. The scheduling agent may check the server for changes to the configured settings of the user's micro-classification. In the event of changes to the user's micro-classification, the server may download and the client package may install changes to the user's configuration settings.

As illustrated in FIG. 2, in response to the selection of or subscription to at least one profile by the user, the client install package relays the selection to the social configuration server. The server downloads and the client installation package installs the configuration settings of the at least one selected profile. The server processes incoming configuration modifications that are mapped to specific user or group profiles. Over time, these mapped configuration modifications help define the defaults for a user or group profile.

The client installation package may relay a user's own modifications to configuration settings after software installation to the server. The server may update the configured settings of the at least one selected profile accordingly. In an embodiment, a scheduling agent may prompt the client installation package to periodically check the server for changes made to the configuration settings of the at least one selected profile. If changes have been made to a profile, the server may download updated configuration settings.

As illustrated in FIG. 3, the client installation package may relay a user's configuration settings of a software product to the server, so the server can process a transitive comparison with the configuration settings of other users' software products. For example, the configured settings of Program A may show that a user is similar to a number of other users of Program A. The server may download the configuration settings of Program B, when the other users also have Program B installed.

When there are multiple programs for transitive comparison, the server may use the configured settings of the program with the most users for any new software product installation and configuration. Alternatively, the server may utilize an intersection of users that have the same multiple programs to determine the appropriate configured settings for a new software product installation and configuration.

In an embodiment, the server may vary the transitive comparison based upon the type of software product. For example, for a word processing or text program, the server may look at the configuration settings of users of similar text applications. However, for games, the server may look at the configuration settings of other gamers.

As illustrated in FIG. 4, the client install package may relay a user's selected installation options to the server, which are stored on the server along with an appended directory. The client installation package may automatically utilize the information contained in the appended directory to alter defaults for installation and configuration of future software products. For example, if a user changes the installation options or defaults for a game, an appended directory (e.g., C:\ProgramFiles\Games\) is created. Future installation of games may access the default location "Games".

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in a variety of computer programming languages. The program code may be executed entirely on at least one computing device, as a stand-alone software package, or it may be executed partly on one computing device and partly on a remote computer. In the latter scenario, the remote computer may be connected directly to the one computing device via a LAN or a WAN (for example, Intranet), or the connection may be made indirectly through an external computer (for example, through the Internet, a secure network, a sneaker net, or some combination of these).

It will be understood that each block of the flowchart illustrations and block diagrams and combinations of those blocks can be implemented by computer program instructions and/or means. These computer program instructions may be provided to a processor of at least one general purpose computer, special purpose computer(s), or other programmable data processing apparatus to produce a machine, such that the instructions, which execute via the processor of the computer or other programmable data processing apparatus, create means for implementing the functions specified in the flowcharts or block diagrams.

The exemplary and alternative embodiments described above may be combined in a variety of ways with each other. Furthermore, the steps and number of the various steps illustrated in the figures may be adjusted from that shown.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

What is claimed is:

1. A method for installation and configuration of a software product, comprising:
    analyzing a user's configuration settings of an installed first software product;
    comparing the configuration settings of the installed first software product with the configuration settings of a number of other users' installed software products; and
    if the configuration settings are similar, downloading the other users' configuration settings for use in the user's installation and configuration of a second software product.

2. A method according to claim 1, wherein the configuration settings are considered similar if a predetermined percentage of the settings are the same or a predetermined number of users applied the same settings.

3. A method according to claim 1, wherein, when there are multiple programs for comparison, the configuration settings of the software product with the most users are applied to the user's installation and configuration of a second software product.

4. A method according to claim 1, wherein the configuration settings of users having the same multiple programs are applied to the user's installation and configuration of a second software product.

5. A method according to claim 1, wherein the comparing of configuration settings compares configuration settings of the same type of software product.

6. A system for installation and configuration of at least one software product comprising:
    at least one client install package capable of utilizing a social network for installing software; transmitting configuration settings; transmitting post-installation configuration settings; and responding to post-installation configuration modifications;
    a server that stores and aggregates the configuration settings of a plurality of users, forming at least one social network, and processes a transitive comparison of a user's configuration settings of a software product with configuration settings of other users' software products, and
    uses the transitive comparison to download configuration settings of a second product for the user when the other users have the second product installed.

7. A system according to claim 6, further comprising a scheduling agent for prompting the at least one client installation package to contact a user, the server, or a combination thereof.

* * * * *